United States Patent [19]

Leitzke et al.

[11] Patent Number: 4,604,279
[45] Date of Patent: Aug. 5, 1986

[54] PROCESS FOR PRODUCING OZONE

[75] Inventors: Ortwin Leitzke, Kaarst; Ewald Wolf, Karben, both of Fed. Rep. of Germany

[73] Assignee: Messer Griesheim GmbH, Frankfurt, Fed. Rep. of Germany

[21] Appl. No.: 773,030

[22] Filed: Sep. 6, 1985

[30] Foreign Application Priority Data

Sep. 18, 1985 [DE] Fed. Rep. of Germany ....... 3434169

[51] Int. Cl.$^4$ ............................................. C01B 13/10
[52] U.S. Cl. ........................................ 423/581; 55/58
[58] Field of Search ...................... 423/581; 55/26, 58, 55/75

[56] References Cited

U.S. PATENT DOCUMENTS 3,921,002  11/1975  Williams et al. .................... 423/581
4,280,824  7/1981   Lassmann et al. ................... 423/581
4,468,237  8/1984   Fuderer .................................. 55/26
4,482,361  11/1984  Whysall .................................. 55/26
4,515,605  5/1985   Inoue et al. ............................ 53/26
4,528,000  7/1985   McGill et al. .......................... 55/58

FOREIGN PATENT DOCUMENTS 3230922  2/1984  Fed. Rep. of Germany ...... 423/581

Primary Examiner—Andrew H. Metz
Assistant Examiner—Anthony McFarlane
Attorney, Agent, or Firm—Connolly & Hutz

[57] ABSTRACT

Ozone is produced from oxygen in an ozone generator and is separated from the unconverted oxygen in a pressure swing adsorber. The ozone drawn off from the pressure swing adsorber passes through an equalizing tank at least partially filled with silica gel before it is mixed with a flowing medium.

6 Claims, 1 Drawing Figure

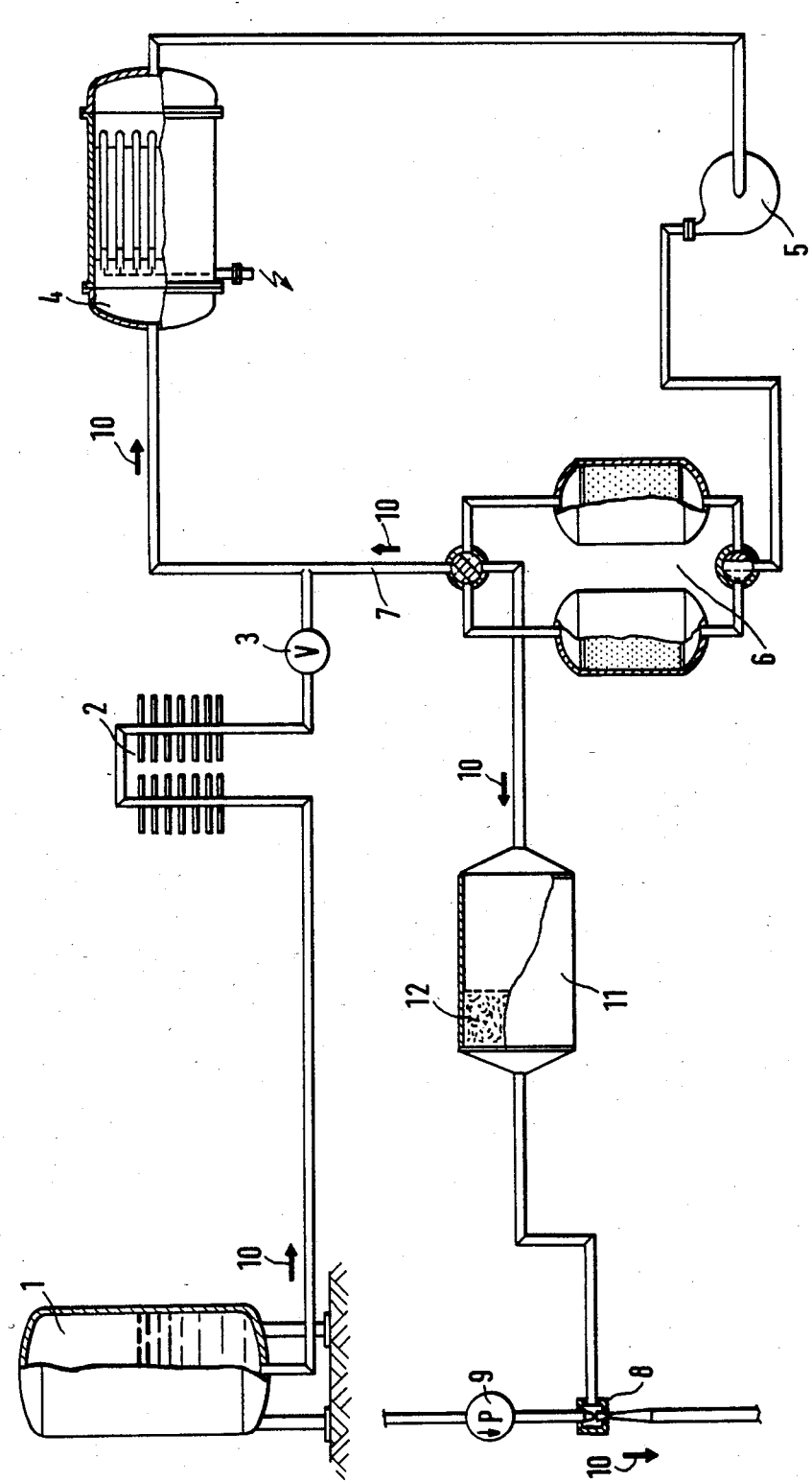

PROCESS FOR PRODUCING OZONE

BACKGROUND OF THE INVENTION

The present invention pertains to a process for producing ozone for the treatment of materials, according to which process the ozone is produced from oxygen in an ozone generator.

Ozone is an excellent oxidant for many organic and inorganic compounds. It is possible, for example, to treat undesirable components present in water to discolor or detoxify them or to render them biodegradable or flocculable. The oxidizing effect of ozone is utilized in chemistry, e.g., to produce acid. Pulp is bleached with ozone. The surface of plastics can be modified by ozone treatment. Gases can also be reacted with ozone; for example, nitric oxide can be oxidized with ozone.

For industrial applications, ozone is produced in ozone generators by silent electric discharge from air or pure oxygen. Since only part of the oxygen fed into the ozone generator is transformed into ozone, the nonconverted oxygen must be separated from the ozone and recycled into the ozone generator in the case of ozone generation from pure oxygen for economic reasons. This oxygen separation can be carried out in pressure swing absorbers. The ozone is adsorbed by silica gel in these plants during the adsorption phase under slightly increased pressure. The ozone is subsequently desorbed under a somewhat lower pressure during a desorption phase. A scavenging gas is used for the desorption; however, it has the disadvantage of diluting the desorbed ozone.

A process in which the desorption is carried out under lower than atmospheric pressure is known from DE-OS No. 32 30 922. The vacuum is generated, e.g., by a water jet gas compressor. The ozone is drawn off from the pressure swing adsorber without dilution and is mixed with the water of the water jet gas compressor. the ozone can undergo the intended reactions even in this water, if so desired.

It has been found in connection with the practical application of the process according to DE-OS No. 32 30 922 that the ozone concentration in the desorbed gas is not constant during the desorption process. A high concentration peak appears at the beginning of the desorption process, and the ozone concentration decreases continuously during the desorption. In addition, a considerable pressure rise occurs in the desorption pipe at the beginning of the desorption phase, especially when the vacuum applied is low and the volume of the desorption pipe is small.

The fluctuations in concentration are caused by the decreasing ozone loading of the silica gel during the desorption phase. The concentration is also influenced by residual oxygen which has been adsorbed in the silica gel and in the free and pore volumes of the silica gel adsorber during the adsorption process, because it is also present in the desorbed gas. Such variations in concentration and pressure are irrelevant for many applications. However, they can have an adverse effect on the intended reactions with ozone when the reaction and hold times are short.

SUMMARY OF THE INVENTION

The present invention therefore has as its object improving the process known from DE-OS No. 32 30 922 in such a way that the ozone desorbed under lower than atmospheric pressures can be fed into the vacuum-generating machine under constant pressure and at constant concentration.

The process according to the present invention has the advantage that the pressure and concentration peaks occurring in the desorbed gas can be compensated and equalized. The pressure and concentration can be maintained below hazardous limit values at low cost. In addition, uniform ozone concentrations permit shorter hold times of the reaction partners in the reactions of ozone. The limit values to be observed are 0.6 bar (absolute) for the pressure and 160 g/l technological cubic meter of gas for the concentration.

THE DRAWING

The single FIGURE illustrates an example of the present invention in which the lower than atmospheric pressure for the desorption of the ozone is generated in a water jet gas compressor.

DETAILED DESCRIPTION

The oxygen used to generate ozone is taken from an upright tank 1 in liquid form, evaporated in the evaporator 2, its pressure is reduced to a pressure of 0.5 to 2 bar (absolute) in the pressure reducer 3, and fed into the ozone generator 4. The ozone-oxygen mixture produced in the ozone generator 4 is fed into the pressure swing adsorber 6 by the circulating blower 5. The pressure swing adsorber 6 consists of at least two silica gel-packed containers which are cycled at intervals of 0.5 to 5 minutes. Ozone is adsorbed in one of the containers, while the oxygen passes through the container and is returned cleanly and without contamination for ozone generation via the pipe 7.

At the same time, ozone is desorbed in the other container under a lower than atmospheric pressure. The vacuum is generated by a water jet gas compressor 8. This generates a vacuum of better than 0.2 bar (absolute) on the suction side toward the pressure swing adsorber 6. The pressure of the water jet which serves as the flowing medium is increased by the pump 9 so much that the water jet gas compressor 8 reaches the required suction capacity. The directions of flow are indicated by the arrows 10.

The desorbed gas, which consists of ozone and residual oxygen, which is drawn off from the pressure swing absorber 6, is passed through an equalizing tank 11 under vacuum before it is mixed with water as the flowing medium in the water jet gas compressor 8. This equalizing tank 11 has three times the volume of one container of the pressure swing adsorber 6 and is filled with silica gel 12 to one-third. The silica gel 12 is arranged on the outlet side of the equalizing tank 11.

The equalizing tank 11 causes a reduction of the pressure rise at the beginning of the desorption phase and equalization of the ozone concentration in the desorbed gas before it is introduced into the reaction medium. The ozone generated in the ozone generator 4 is consequently separated from the oxygen practically completely due to the adsorption on silica gel in the pressure swing adsorber. It is subsequently desorbed by applying vacuum. It is adsorbed and stored again—by the silica gel 12 of the equalizing tank 11—in the third step. Finally, it is uniformly released into the flowing medium which serves as the transport or reaction medium in the fourth and last step.

Of course, the process according to the present invention is not bound to the use of water jet gas compressors to generate vacuum. For example, the vacuum can also be generated by an injector and a gaseous medium serving as the flowing medium. The vacuum can also be generated by a pump, and the flowing medium is used only as a transport medium for the ozone.

The volume of the equalizing tank is dependent primarily on the suction pressure applied. Its volume is usually two to four times the volume of one container of the pressure swing adsorber 6. The equalizing tank 11 can also be filled with silica gel to more than one-third. In general, one should seek to prevent the pressure peak of the desorbed gas from exceeding 0.6 bar (absolute) and the ozone concentration from exceeding 160 g ozone/m$^3$ gas relative to the technological state at the beginning of the desorption phase, i.e., when switching over from adsorption to desorption as well as during the reduction of the pressure in the particular container of the pressure swing adsorber 6 through the combination of the suction pressure applied, which is generally lower than 0.2 bar (absolute), of the free volume of the equalizing tank 11 and of the volume of the silica gel 12. If these limited values are not exceeded, it is also achieved that the ozone is released at a highly uniform concentration after the equalizing tank 11.

SUMMARY

Ozone is produced from oxygen in ordinary ozone generators 4 and is separated from the nonconverted oxygen in a pressure swing adsorber 6 by adsorbing it there on an adsorbent mass. The desorption can be carried out with a scavenging gas or vacuum. The vacuum method has the advantage that the ozone is not mixed with a scavenging gas, but is mixed in pure form to a flowing medium and is reacted. However, pressure and concentration peaks occur during the desorption phase under vacuum, especially at the beginning of the desorption phase. This is undesirable when uniform ozone supply for material treatment is important.

To eliminate such pressure and concentration peaks, with the present invention the ozone is passed through an equalizing tank 11 under vacuum; this equalizing tank is arranged between the pressure swing adsorber and the vacuum generating means and is filled at least partially with silica gel 12.

What is claimed is:

1. In a process for producing ozone in which the ozone is produced from oxygen in an ozone generator, wherein said ozone is separated from the oxygen not converted into ozone in a pressure swing adsorber during an adsorption phase under reduced pressure and at ambient temperature, and the oxygen not converted into ozone is returned to the ozone generator, after which the adsorbed ozone is drawn off from the pressure swing adsorber during a desorption phase under lower than atmospheric pressures which are created by a vacuum-generating machine which employs a flowing medium for generating the vacuum, and said ozone is mixed with the flowing medium, the improvement comprising passing the ozone from the pressure swing adsorber through an equalizing tank which reduces the pressure rise at the beginning of the desorption phase and equalizes the ozone concentration in the desorped gas with the equalizing tank being located between the pressure swing absorber and the vacuum generating machine, said equalizing tank being filled at least partially with silica gel, and mixing the ozone from the equalizing tank with the flowing medium.

2. Process in accordance with claim 1, characterized in that the volume of the equalizing tank is from two to four times the volume of one adsorption container of the pressure swing adsorber.

3. Process in accordance with claim 2, characterized in that at least one-third of the volume of the equalizing tank is filled with silica gel.

4. Process in accordance with claim 3, characterized in that the silica gel is arranged at the outlet side of the equalizing tank.

5. Process in accordance with claim 1, characterized in that at least one-third of the volume of the equalizing tank is filled with silica gel.

6. Process in accordance with claim 5, characterized in that the silica gel is arranged at the outlet side of the equalizing tank.

* * * * *